E. Juanes y Patrullo.
Hemp Brake.
Nº 61,244.   Patented Jan. 15, 1867.
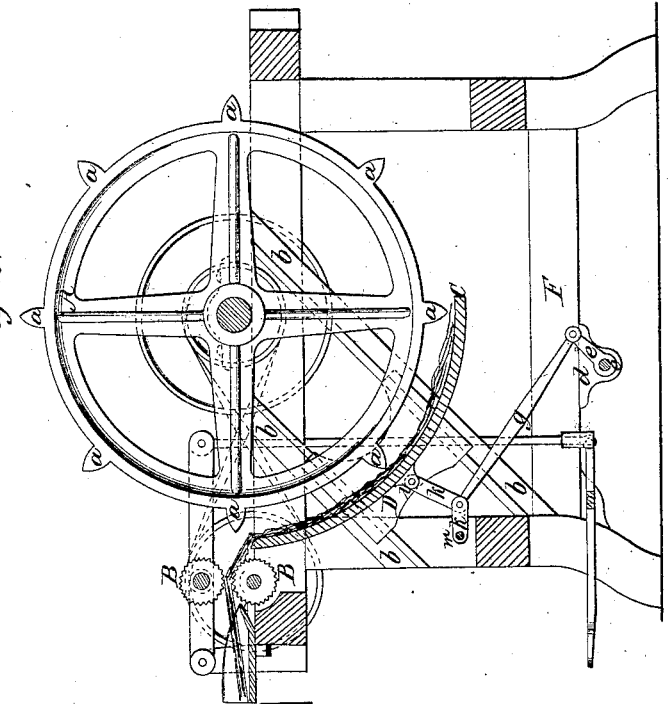
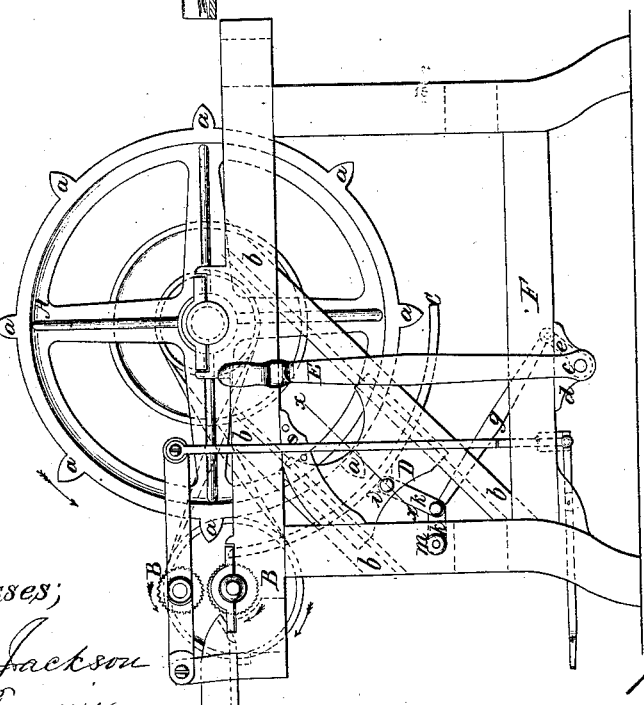
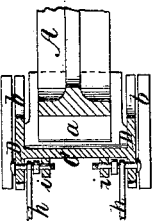

United States Patent Office.

EDUARDO JUANES Y PATRULLO, OF NEW YORK, N. Y.

Letters Patent No. 61,244, dated January 15, 1867.

---

IMPROVEMENT IN MACHINE FOR PREPARING THE FIBRE OF PLANTS.

---

*The Schedule referred to in these Letters Patent and making part of the same.*

---

TO ALL WHOM IT MAY CONCERN:

Be it known that I, EDUARDO JUANES Y PATRULLO, of the city, county, and State of New York, have invented a new and useful Improvement in Machinery for Dressing and Separating the Fibre of Plants; and I do hereby declare that the following is a full, clear, and exact description, which will enable others skilled in the art to make and use the same, reference being had to the accompanying drawings, forming part of this specification, in which—

Figure 1 is a side elevation of my improved machinery for dressing fibrous plants.

Figure 2 is a longitudinal vertical section of the same.

Figure 3 is a partial transverse section, taken in the plane of the line $x\,x$, fig. 1, showing a detached view of my particular improvement.

Similar letters of reference indicate like parts.

This invention relates to an improvement in machinery for dressing and separating the fibre of the leaves and stalks of tropical and other plants, for which Letters Patent have been granted to me, dated the 5th day of March, 1861, the 23d day of April, 1861, and the 28th day of April, 1863, respectively, and consists in the application of devices for adjusting and regulating the pressure of the apron against the fibrous material when operated on by the drum and beaters thereon, whereby the machinery is more effective in dressing fine and delicate fibre, such as is contained in the leaves and stalks of the banana, cocoa, flax, and other plants, and may be advantageously employed also in dressing plants with coarser fibre, such as the *Agave Americana*. In the general construction and operation of the machinery I conform to the plans and methods described in the specifications of my patents before referred to, rendering it unnecessary to explain in detail any but those parts which constitute my improvement and their connections.

A is the vertical drum, on the periphery of which are placed the beaters $a\,a$, in front of which are placed the crushing or feed-rolls B B, constructed, arranged and operated as described in the said patents. The segmental apron C is placed below the drum A, to receive the fibrous plants from the feed-rolls B B, as in my patent dated March 5th, 1861. It is not suspended by hinges, however, as therein arranged, but is supported on a sliding-frame, D, which rests on each side in a double set of parallel slide-rests, $b\,b$, above and below, which slide-rests rise at an angle of about 45° in line with the diameter of the drum A, and are attached to the frame of the machine. The apron C is made to traverse, with the sliding-frame D, upon the slide-rests $b\,b$, for the purpose of adjusting and regulating its pressure equally upon the beaters $a\,a$ on the drum A, by means of a series of levers and rods connected therewith. On the right-hand side of the machine, convenient to the operator, an upright lever, E, is made fast at its lower end to the end of a rod or rock-shaft, $c$, which runs across the frame and is suspended on bearings, $d\,d$, placed on the lower rail F F, on both sides of the machine. Inside of the frame, on each side of the machine, the arms $e\,e$ are set fast upon the rock-shaft $c$, on the ends of which arms, $e\,e$, are pivoted long connecting-rods, $g\,g$, the upper ends of which are pivoted to the ends of short rods, $h\,h$, which are also pivoted at their other ends to lugs, $i\,i$, fastened on the under side of the apron C. Upon the same pivots which connect the ends of the long rods $g\,g$ and the short rods $h\,h$, are attached the short rods $k\,k$, which are suspended on a cross-rod, $m$, placed in the front part of the machine, between the upper and lower slide-rests $b\,b$. By this arrangement of levers and connecting-rods, it is evident that the apron C may be moved with the sliding-frame D, so as to be adjusted accurately in every part, nearer or further from the periphery of the drum A, thus bearing equally upon all parts of the fibrous material, and bringing it everywhere in close contact with the beaters $a\,a$, as desired, which even and complete contact could not be accomplished by the apron suspended on hinges. For keeping the apron in place as it may be adjusted, the lever E will be provided with suitable space-stops.

Having described my invention, I claim as new, and desire to secure by Letters Patent—

The combination of the apron C with the sliding-frame D, operated by the lever E, and arranged substantially as and for the purposes herein described.

EDUARDO JUANES Y PATRULLO.

Witnesses:
WM. F. MCNAMARA,
ALEX. F. ROBERTS.